United States Patent [19]
White

[11] Patent Number: 5,091,979
[45] Date of Patent: Feb. 25, 1992

[54] SUB-MICRON IMAGING

[75] Inventor: Donald L. White, Lake Parsippany, N.J.

[73] Assignee: AT&T Bell Laboratories, Murray Hill, N.J.

[21] Appl. No.: 673,615

[22] Filed: Mar. 22, 1991

[51] Int. Cl.⁵ .......................... G02B 6/10; G02B 6/12
[52] U.S. Cl. ......................................... 385/1; 385/3; 385/4
[58] Field of Search .................. 350/96.11–96.14, 350/162.17, 162.2, 162.16, 452

[56] References Cited

U.S. PATENT DOCUMENTS

| | | | |
|---|---|---|---|
| 3,884,549 | 5/1975 | Wang et al. | 385/129 |
| 3,970,959 | 7/1976 | Wang et al. | 385/2 |
| 4,142,775 | 3/1979 | Ramaswamy et al. | 385/41 |
| 4,364,633 | 12/1982 | Verber et al. | 385/3 |
| 4,592,043 | 5/1986 | Williams | 385/18 |
| 4,696,536 | 9/1987 | Albares et al. | 385/14 |
| 4,750,801 | 6/1988 | Alferness | 385/27 |
| 4,923,264 | 5/1990 | Langer et al. | 385/2 |
| 5,042,895 | 8/1991 | Chouinard et al. | 385/2 |

OTHER PUBLICATIONS

M. D. Levinson et al, *IEEE Trans. Electron Devices*, vol. ED-29 (12), p. 1828 (1982).
*Optical Fibers for Transmission*, John E. Midwinter, p. 54, pub. John Wiley & Sons (1979).

*Primary Examiner*—Akm Ullah
*Attorney, Agent, or Firm*—George S. Indig

[57] ABSTRACT

Imaging at sub-micron dimensions—at dimensions ordinarily thought to approximate those within diffraction limitations of the chosen imaging radiation—is expedited by use of a new category of phase masks. The new mask structure provides for phase shifting by use of waveguides. Waveguides of such dimensions, material, and spacing as to accommodate image resolution impairment, may consist of filled or unfilled apertures or of protuberances, all of constant length equal to the thickness of the mask layer in which constructed.

34 Claims, 2 Drawing Sheets

SUB-MICRON IMAGING

BACKGROUND OF THE INVENTION

1. Technical Field

The invention relates to apparatus and processing entailing sub-micron imaging. An important aspect relates to the fabrication of small-dimensioned devices, e.g. integrated circuits using sub-micron design rules and to apparatus/tools used in such fabrication. While implications are broad, a major thrust concerns lithographic delineation—the use of phase masks to improve image quality. Whether based on presently used delineating energy, e.g. in the near ultraviolet spectrum, or on shorter wavelength, e.g. in the deep ultraviolet or x-ray spectra, improvement in lithographic delineation extends the range to permit further miniaturization. Fabrication of Very Large Scale Integrated circuits—electronic as well as optical and hybrid—built to sub-micron design rules is contemplated.

2. Description of the Prior Art

The saga of Large Scale Integration from inception to the present time is well-known. Evolution of the present 1-2 megabit chip, built to design rules at or slightly below 1 $\mu$m, does not represent the ultimate product. Lithographic definition has played, and will continue to play, a significant role. Fabrication of state-of-the-art devices depends on use of near-ultraviolet radiation (e.g. of wavelength, $\lambda = 3650$ Å—the mercury I line). Intensive effort directed toward next generation devices is expected to depend on radiation of still shorter wavelength (radiation within the "deep UV" spectrum, e.g. of wavelength, $\lambda = 2480$ Å—the krypton fluoride excimer laser line). Forward-looking work directed toward still smaller design rules contemplates electromagnetic energy in the x-ray spectrum or, alternately, accelerated electron radiation of equivalent decreased wavelength.

A competing effort seeks to extend the capability of presently used UV delineating radiation. As described by M. D. Levenson et al, *IEEE Trans. Electron Devices*, vol. ED-29 (12), p. 1828 (1982) and as reviewed in a New York Times article dated Dec. 12, 1990, design rule-limiting edge resolution is lessened by use of "phase masks"—that is, masks designedly providing for relative phase shifting of radiation as transmitted through selected mask areas. Impact is two-fold: (1) as applied to usual device fabrication entailing opaque featured masks (e.g. chrome on glass) and (2) as applied to such fabrication entailing clear masks, dispensing with opaque mask features, in which use is made of dark-line imaging resulting from interference as between transparent mask regions of differing phase delay. In either event, use of phase masks permits extension to design rules generally thought beyond the capability of the particular wavelength used, with extension due to phase cancellation of diffraction-scattered radiation at feature edges. In both instances, provision is made for 180° phase shift regions—either adjacent, or as an integral part of edge-defining mask areas.

Phase masking is considered promising in accordance with traditional business considerations. It permits fabrication of next-generation devices using present equipment and processing. Avoidance of cost of replacement equipment (in any event not yet commercially available), as well as of retraining of personnel assures continuing effort in this direction.

A widespread view serves as basis for expected extension of UV-based processing to design rules below 0.3-0.25 $\mu$m by use of phase masking—likely to the 0.2 $\mu$m and below range commonly thought beyond the effective capability of UV delineation. To the extent that this proves to be correct, device fabrication by use of x-ray (whether proximity or projection) as well as by use of accelerated electron radiation (whether by beam writing or masking) is likely to be deferred to the turn of the century.

Limiting lithographic resolution varies in accordance with the classical relationship:

$$\text{Resolution} = \frac{K_1 \lambda}{NA}$$

in which:
$\lambda$ = wavelength of delineating radiation in appropriate units, e.g. $\mu$m NA is the numerical aperture of the optical system, Resolution is on the basis of desired feature-space contrast and $K_1$ is a constant which depends upon details of the imaging system, and characteristics of the delineating process, e.g. of the development process—a value of 0.7-0.8 is representative of state-of-the-art fabrication (of 0.8-1.0 $\mu$m design rule LSI).

180° phase mask processing for given wavelength/etch contrast may be described in terms of reduction of $K_1$ to the $\approx 0.5$ level (permitting fabrication of devices to design rule of $\approx 0.4$ $\mu$m), and in some instances to the $K_1 \approx 0.3$ level to yield quarter micron features.

SUMMARY OF THE INVENTION

Co-filed U.S. application Ser. Nos. 07/673,614 and 07/673,626 are central to this discussion. The first concerns improved use of phase masks, e.g. as provided with multiple values of phase delay. As used in projection systems, improved resolution relative to use of earlier binary-valued phase masks is owing to more precise accommodation of phase shift of radiation which is subject to phase deviation from nominal values, as introduced during transmission through or reflection from the mask, e.g. as due to proximity effects. The same versatility permits construction of scattering structures—diffraction gratings—to lessen the effects of unwanted variations in illumination intensity on the image plane.

The second co-filed application is largely concerned with a means for attaining such multiple values and otherwise causing local changes in phase by variation of the physical length of the relevant radiation path. The approach entails (1) aperture generation and (2) aperture back filling to result in layer thickness averaging—to achieve a many-leveled variation in layer thickness.

The present invention represents an approach alternative to physical averaging. Instead, desired phase delay is the consequence of waveguides in the relevant mask layer—waveguides of at minimum a least dimension sufficiently small to alter phase. In general terms, the inventive approach may be described as "optical averaging"—entailing waveguides of such dimension, spacing and distribution as to yield a wave front of desired properties on the image plane, e.g. on the wafer. The fundamental principles are well-known—they are applied to result in mask regions producing corresponding wave front regions of desired phase uniformity (of uniformity increasing as guide-to-guide separation dimensions decrease below resolution limits).

Use of such waveguiding in mask design permits attainment of all of the many objectives set forth in the first co-filed application. These include: lessening of edge smearing scattered radiation; provision of desired gray scale; and generation of the device-functioning patterning itself. Such waveguiding may serve by itself, or may be used to supplement tailoring of thickness and/or refractive index.

From the design standpoint, most expeditious implementation takes the form of circular guides—e.g. apertures in non-transmitting (reflective or absorptive) layer material; filled apertures, of increased refractive index in transparent material; or, alternatively, may take the form of cylindrical or other shape transparent protrusions—perhaps as constructed from transparent layer material, Arrays of closely spaced guides may produce the desired vector sum front. An example consists of a linear array of appropriate phase and spacing relative to a feature edge to achieve cancellation of edge smearing radiation. A line grating designed to diffract radiation out of the system may take the form of a succession of such linear arrays of proper line-to-line spacing. Where sloped transitions are desired, this may be accomplished by appropriate variation in guide dimensions as well as guide-to-guide spacing. Other variations are apparent.

Use of non-circular guides may be useful. Use of elliptical or rectangular waveguides may designedly produce different phase shifts for the two polarizations—an effect of magnitude which may be determined by relative minimum:maximum cross-sectional dimensions. Freedom of choice of either or both dimensions within or outside of the $\approx\lambda$ range advances the objective. The advantage must be balanced against complication due to permitted co-existence of varied radiation modes. Guides, whether apertured (filled or unfilled) or protrusions, may be of a variety of configurations—elliptical, rectilinear, etc. Since likely many-moded, design requires more extensive calculation, or, alternatively, may be determined experimentally. Under some circumstances, the broader range in phase spread resulting from many-moded nature may serve to advantage. As described in some detail in the co-filed applications, there are circumstances under which a compromise as between optimal cancellation (resulting from narrow spread in phase angle) and lessened magnitude of ringing amplitude (accentuated by narrow spread in phase angle) may suggest the broader range.

The invention is concerned with apparatus and processes entailing imaging—most importantly, imaging at sub-micron dimensions. An important aspect of the invention is directed to device fabrication involving at least one level of pattern delineation dependent on image transfer from a mask to a device in fabrication, and description is largely in terms of this aspect. The inventive approach provides means for satisfying the function of phase masking, i.e. that of deliberate introduction of variation in phase front as incident on the image plane. While such phase variation may have implications in terms of fundamental device delineation, its primary justification is in terms of satisfying the inventive thrust—importantly, that of improving image resolution and, possibly, of improving other aspects of image quality as well.

As described in the first co-filed application, additional functions are conveniently implemented by phase masking of the invention. "Compensating information" primarily designed to improve resolution in the terms set forth may provide as well for unwanted illumination inhomogeneity and for cancellation of ringing crests. While suitably applied to improvement based on use of opaque mask features, the phase masking approach may serve for feature generation as well—thereby resulting in a mask transparent in its entirety.

DETAILED DESCRIPTION

Introductory Comments

Figure 1:
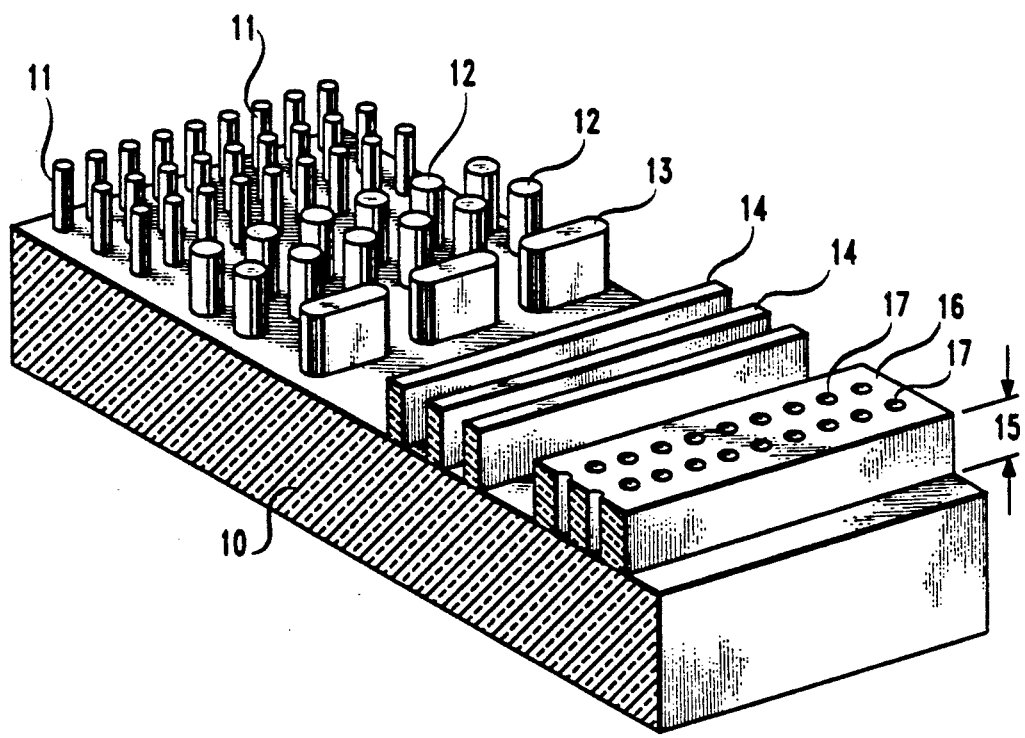
FIG. 1 is a perspective view of a portion of a mask for fabricating a device—e.g. a VLSI—depicting waveguides of a variety of configurations suitable for attaining the inventive objective.

The generic function as described, e.g. by M. B. Levenson, cited above provides for improvement in resolution by phase cancellation/lessening of resolution-impairing edge-scattered radiation. An important aspect of this invention goes beyond this prior art in furthering resolution improvement by accommodation of a variety, even a continuum, of phase values of such resolution-impairing radiation. Processing flexibility afforded by the ability for "non-180°" phase change is valuable in other respects as well. As described in detail in Ser. No. 07/673,614 filed 3/22/1991 circuit design approaches not otherwise practicable are facilitated. Examples, importantly as directed to image features produced by interference, include line termination as well as line branching, both of which depend upon availability of a plurality of phase delay values. Flexibility afforded by use of this form of mask is valuable in expediting construction of a variety of patterns beyond the capability of single-step lithographic delineation as limited to 180° phase shift. For example, always without need for introduction of a separate delineation step, it permits construction of "blazed" diffraction gratings based on grating lines of right triangle cross-section (lines of one perpendicular edge and one sloping edge with the triangle base on the supporting surface). Gratings of this form are useful e.g. in the construction of computer-generated holograms as well as diffractive optical elements exhibiting high signal-to-noise ratio. Co-filed U.S. application Ser. No. 07/673,614 advances the objective of improved resolution beyond that realized from simple 180° phase shift of earlier work. The present invention offers a means for implementing the responsible multiplicity of phase shift values—ultimately providing for a near-continuum of such values.

While the invention provides generically for improvement in edge resolution regardless of scale, and while expected commercial value is not size limited, it is expected that most significant utilization will concern fabrication of Very Large Scale Integration devices—in particular, those built to design rules of 1 micrometer or less.

Phase masks, as previously considered, accomplished phase shifting by simple, total-thickness removal of appropriate regions of transparent layer material so as to present but two levels of phase delay—generally with the two levels differing by 180°. Companion application Ser. No. 07/673,626 additionally provides for regions of varied thickness and/or varied refractive index, both with reference to unmodified regions—likely with reference to unmodified regions of transparent material of homogeneous thickness and composition as initially produced. As there described, facility for phase shift at a plurality of values—even a continuum of values—permits enhanced results (in terms of VLSI fabrication permits significantly smaller design rules than associated with two-level phase masking). All such approaches accomplish the objective by varying the bulk transit time through varying thickness or refractive index of the layer material.

By contrast, the inventive approach entails waveguides extending through the relevant layer, with such guides of appropriate characteristics—cross-sectional shape and dimension, refractive index, and distribution—to yield the desired phase shift/s. Parameters required to yield such individual guide characteristics as well as those of consequence with regard to guide-to-guide spacing to assure a combined wave front to sufficiently approximate a flat front (as equivalent to that resulting from use of regions of altered thickness and/or index) are largely available from the literature and are discussed in the Detailed Description.

Use of waveguiding offers a further degree of flexibility in device design. For example, guide-to-guide spacing, while invariably less than some maximum value to assure desired wavefront flatness, may be varied within this limit to tailor brightness (gray scale). This, as other considerations, have reference to such characteristics as measured on the image plane, i.e. on the wafer in the instance of VLSI fabrication.

A variety of waveguides structures are suggested. A version resembles an optical fiber in providing for a core-clad structure of relatively large refractive index core. The simplest example is that of an etchant-defined pillar (core) with atmospheric-air cladding. Variants are described. An alternative makes use of apertured metal either as a coating on a flat surface of a transparent layer, or as defining the guide (either as a coating on the inner guide surface or as the layered material within which the guide is constructed).

Initial implications of the inventive teaching are expected to be in terms of projection-reduction imaging using UV delineating radiation. The principles are, however, applicable to contact (proximity) as well as 1:1 projection printing, and also to shorter wavelength electromagnetic radiation (e.g. radiation in the x-ray spectrum). Of course, contact printing precludes utilization of diffraction—e.g. diffraction gratings—either for lessening of bright spots or for their contribution to the underlying objective of cancellation of edge smearing radiation. Either function may be served by use of blocking layers provided with aperture guides. Use, e.g. of apertured metal layers, is contemplated for near and deep UV proximity printing.

Implementation of the above in conjunction with such shorter wavelength radiation, whether used in the projection or proximity mode, is complicated by increased demands placed on precision by dimensional considerations as well as other factors. For example, creation of an effective x-ray guide is complicated by the relatively small spread of media-dependent values of refractive index—increasingly for shorter wavelength values within the x-ray spectrum refractive index tends to approach unity for otherwise satisfactory guide media. Advantages to be gained might, nevertheless, justify the effort. Of course, that problem is largely avoided by use of guides constituted by filled or unfilled apertures in metal or other blocking layers.

General Considerations

A major consideration for most aspects of the invention concerns phase velocity. A variety of factors are entailed, e.g., guide dimensions, shape, guide material—core as well as any specific clad.

The overall objective has been set forth. In terms of a valuable embodiment—that of device fabrication dependent upon pattern imaging—values to be realized are conveniently described in terms of image quality as received on the device being fabricated. Relevant design rules—the least dimension provided for on the device/circuit—are importantly such as to approach wavelength limitation of radiation to be used for pattern-delineation of the device. This consideration is well-known and is discussed in the section designated Description of the Prior Art. In general terms, the problem to which the invention is directed concerns design rules smaller than $\lambda/NA$ (which, in accordance with present practice using radiation in the near-UV spectrum is approximately equal to twice the value of wavelength—as based on common system design providing for $NA \approx 0.5$). However, in still more general terms, the inventive approach results in improvement for larger design rules. Aside from yield considerations, invariably advanced by improvement in edge contrast, device performance may be improved where wavelength limitations are not approached in classical terms. Examples concern operating characteristics dependent upon gray scale variations or on phase variations; and a variety of optical elements dependent upon diffraction, e.g. Fresnel lenses or Fresnel zone plates.

The inventive approach is alternative to changing transmission time by corresponding variation in layer thickness and/or refractive index, and in certain instances may valuably supplement this alternative approach. Objectives—including improvement of edge resolution by phase cancellation—entail a variety of waveguide parameters. Guide structures in accordance with the invention, are a part of a host layer—generally a mask layer of uniform thickness, and of uniform refractive index as well for embodiments in which the layer is transparent. Objectives to be attained concern (a) individual guide characteristics, e.g. local phase delay and (b) larger scale effects which depend primarily upon guide-to-guide coupling. Objective (a) depends upon such parameters as guide length (generally constant as determined by the thickness of the host layer), cross-sectional shape, cross-section size—primarily that of the least cross-sectional dimension, bulk transmission properties of the material of which the guide is constructed—in the instance of transparent core-clad structures largely that of the core material although that of the clad may not be ignored. Objective (b) depends upon a number of composition characteristics, but for given guide structure, is based primarily on guide-to-guide spacing.

Uniform phase front regions, equivalent to those resulting from unapertured layer material of constant thickness, is realized by groupings of guides, all of constant phase shift with separation of the order of one or few wavelengths. "Sloped" regions evidencing the continuum of phase delay values characteristic of a region of varying thickness, are realized by groupings of guides of appropriately varying phase delay time, again of separation to result in the close coupling required for a uniform front. Stepped regions—those evidencing marked difference in phase delay at their interfaces require spacing sufficiently close to produce unchanging delay within regions and sufficiently great as to essentially prevent such coupling at interfaces. Variations in geometric considerations e.g. for masks presenting constant as well as varying phase regions are evident from the above. Relevant design/material considerations are discussed below.

An inventive objective is effectively served by use of guide arrays. The objective is provision of gray scale, e.g. for correction of undesired brightness variations attendant upon desired pattern delineation. Linear or two-dimensional arrays of guides, perhaps of circular or other constant shape, but of systematically varying delay time—e.g. alternating as between two different phase shifts—with spacing designedly such as to result in the desired diffraction angle offers a means for tailoring the brightness of affected regions on the image plane. Design parameters to result in diffraction of energy outside the system (generally requiring a diffraction angle greater than NA/demagnification factor) and relative gray tone (e.g. 180° shift between adjacent guides results in black with lesser shift values resulting in corresponding gray tones) are based on known principles. Relevant considerations to expedite grating design e.g. as based on gray scale dependence on the relative power of the different orders of diffraction gratings are described in fundamental texts.

Guide Material

Two fundamental types of waveguide are contemplated: structures dependent upon metallic reflection, e.g. filled or unfilled apertures extending through a metallic layer; and all-transparent structures resembling optical fiber in which guiding follows the familiar principles based inter alia on change in refractive index as between high index core and low index surround—e.g. of air or other host layer material or of specifically provided cladding.

There is a classical formula for calculating phase velocity in a waveguide of the form of an apertured metallic layer (or the equivalent—a metal coated transparent guide, e.g. a metal coated unfilled hole or metal coated clear material). The formula is set forth:

$$V_1 = \frac{c}{\left(1 - \frac{\lambda^2}{\lambda^2_{cutoff}}\right)^{\frac{1}{2}}}$$

where:

$V_1$ = the phase velocity of the delineating electromagnetic radiation in an individual waveguide structure c = velocity of the radiation in the guide medium $\lambda$ = the wavelength of such radiation in the guide medium—in free space for unfilled aperture guides; in the bulk guide material e.g. for filled aperture guides $\lambda_{cutoff}$ is the wavelength for radiation at the cutoff of the guide.

Phase velocity is a strong function of size as cutoff is approached. For many purposes with regard to submicron values of $\lambda$ of device-delineating radiation, this is of significance for $\lambda > \lambda_{cutoff}$ but $< 2\lambda_{cutoff}$.

Guiding properties of the all-transparent structures are less sensitive to variations in dimension and are generally preferred. Rigorous design considerations are not so simply set forth in terms of a simple definitive formula but rather depend upon solution for the specific waveguide structure. The simplest case is that of periodic slabs (or planes) of high and low index glass. The phase velocity is computed by solving the following set of equations.

$$k_1^2 + \gamma^2 = [n1^2 - n2^2] \cdot 4 \cdot \frac{\pi^2}{\lambda^2}$$

$$k_1 \cdot \tan\left(k_1 \cdot \frac{W1}{2}\right) = \gamma \cdot \tanh\left[\gamma \frac{W2}{2}\right]$$

$$k_z = \left(4 \cdot \frac{\pi^2}{\lambda^2} \cdot n1^2 - k_1^2\right)^{\frac{1}{2}}$$

$$V_1 = 2 \cdot \frac{\pi \cdot c}{\lambda \cdot k_z}$$

where:
c = velocity of the radiation in free space
$\lambda$ = wavelength of the radiation in free space (note—since c and $\lambda$ enter the equation only as a dimensionless fraction, barring anamolies, the two quantities may be measured in any common medium)
$k_1$ is the wave vector in the high index material perpendicular to the direction of propagation
$\gamma$ is the decay constant in the low index material
W1 the width of the high index material of index n1
W2 the width of the low index material of index n2
$k_2$ = the propagation wave vector of the mode
$V_1$ = the phase velocity of the mode The above equations may be solved for phase velocity $V_1$ by computer (numerical methods).

For one form of all-transparent structures which are expediently fabricated—those dependent upon free space (or other continuous core-to-core separation material)—phase velocity depends on separation distance as well as on waveguide size. In the extreme case, in which guide (core) and separation are both small—a minor fraction of $\lambda$—phase velocity is the average of the two indices. This approach is not recommended from the standpoint both of construction ease and functioning. In effect, use of such small dimensions results in bulk (non-waveguiding) transmission properties. While this averaging effect is indeed equivalent to that of unstructured material of appropriate thickness, it precludes the advantage of guide properties, e.g. such special effects as resulting from guide-to-guide interference—either constructive or destructive. Considering ease of construction, the waveguiding properties (here as distinguished from averaging effects) favors larger cross-sectional guide dimensions (a major fraction of λ, e.g., for UV radiation of λ=0.36 μm, ≈0.25).

It is convenient to discuss design parameters/ranges in conjunction with consideration of FIGS. 1-4.

Waveguide Shapes

Whether consisting of etch-retained layer material or etch-defined apertures, whether filled or unfilled, configuration and dimensions depend upon the desired radiation characteristics to be produced—in an important instance, upon radiation phase/brightness to lessen resolution—limiting scattering effects. The mask portion shown in FIG. 1 is deliberately designed as basis for discussion relating to such parameters. It is unlikely that any actual operating mask will exhibit such variety of guides within so-well defined a portion. Further, in the interest of avoiding yield-reduction due to contamination, realignment, etc. attendant upon introduction of additional delineation steps, preferred masks as contemplated by the invention include device patterning features (features to constitute the device being fabricated, as well as waveguide features used in device construction but not serving an operating function in the finally fabricated device).

Figure 2:
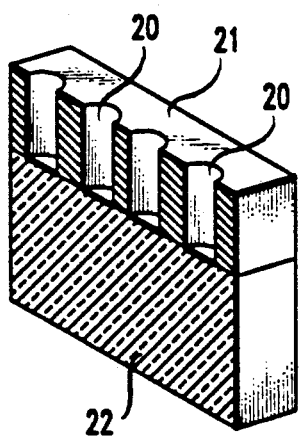
FIG. 2 is a cross-sectional view depicting a phase-shifting structure in accordance with the invention in which guides are simple apertures, in a blocking layer, e.g. in a metal layer.
Figure 3:
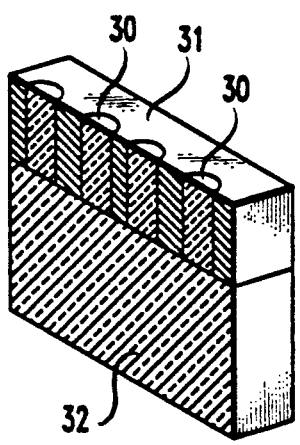
FIG. 3 is a cross-sectional view of a structure of function similar to that of FIG. 2 but in which guiding is primarily/entirely due to provision of core material of greater refractive index than that surrounding material.
Figure 4:
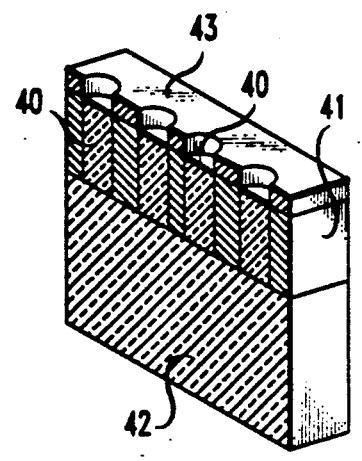
FIG. 4 is a cross-sectional view of a structure as shown in FIG. 3 but additionally including a metal coating on top of the material surrounding the guides.

Two types of guide structures are shown in FIG. 1. Protrusions 11-14 are likely retained material and apertures 17, perhaps subsequently filled, are produced by etching. Likely fabrication entails etch removal of selected regions of material within a layer of homogeneous composition and thickness as supported on substrate 10—a layer of a thickness equal to the retained height dimension e.g. height 15 of apertured region 16. Apertures 17 shown illustratively as cylindrical and of unvarying cross-sectional size may be treated in a variety of ways as shown in FIGS. 2, 3 and 4. Apertures as well as protuberances are expediently shaped to attain desired mask properties. While deliberate variation in shape/size as height-dependent may serve a specific design objective, in most instances such variation is unintended—is the consequence of laxity in processing conditions. From this standpoint, the magnitude of any such variation is more a matter of what can be tolerated consistent with yield considerations. Generally, tolerance for such variation decreases with device size. In manner analogous to tolerance for less-than-perfect cancellation of resolution-limiting edge-scattered radiation in accordance with a major thrust of the invention, a permitted variation may, for many purposes, be ≈10% in the fabrication of sub-micron VLSI as presently contemplated.

Protuberances depicted in FIG. 1 are: 11 and 12, cylindrical; 13, oval; 14, rectilinear. Apertured region 16 is shown as perforated by uniform cylindrical apertures 17. Apertures 17 may be unfilled for instances in which layer 16 is metallic, or for the equivalent structure in which inner surfaces of cylindrical apertures 17 are coated with metal. Where the layer 16 material is transparent, effective waveguiding requires filling with transparent material of greater refractive index than that of layer 16. Design objectives of devices to be mask-delineated may entail apertures of a variety of shapes, e.g. of any of the shapes of the protuberances, i.e. cylindrical, oval, rectilinear.

From the standpoint of ease of fabrication, circular—nominally cylindrical—guides such as 11, 12, 17 are preferred. From the device-functioning standpoint, guiding properties are the same as for square cross-section structures (for square side dimension equal to ≈85% of the cylinder diameter).

Oval shapes, as schematically represented by guides 13, may be dictated by device-fabrication considerations, or by performance considerations serving as overlapping—cylinders to increase brightness (in generic terms with regard to desired gray scale—particularly where host material, e.g. layer material 16, blocks delineating radiation).

Rectilinear guides such as protuberances 14, or equivalent apertures, may facilitate satisfaction of other objectives, e.g. of unidirectional (single polarization) phase change. A sophisticated embodiment of the invention lessens/cancels ringing by proper placement and choice of other characteristics of waveguides to, themselves, produce ringing of the same spacing and amplitude variation but of sign opposite to that of the resolution-impairing ringing. This approach may make use of a variety of guide shapes, e.g., asymmetric such as rectilinear guides 14 or equivalent arrays of symmetrical guides.

FIGS. 2, 3 and 4, for expository purpose shown as involving cylindrical apertures, are representative of guide options regardless of shape—protuberances as well as apertures.

FIG. 2 illustrates the uncomplicated fabrication approach in which unfilled apertures 20 are made in reflective metal material 21 supported by substrate 22.

In FIG. 3 the apertures 30, as produced in layer 31, in turn supported by substrate 32, are filled; in the instance of a transparent layer 31, are filled with transparent material of index greater than that of layer 31.

In FIG. 4 apertures 40 are again shown as filled (by material of refractive index greater than that of surrounding material of layer 41—supported by substrate 42). Overlying apertured metal layer 43 is usefully employed e.g. in providing for reduced brightness (for gray scale). Its use serves to control coupling as between guides 40, and, accordingly, may enable use of unfilled guides. While much of the above discussion has been in terms of resolution improvement, another objective of the inventive approach—that of gratings, e.g. linear or circular—may dictate choice of shape (as well as dimension/index). Gratings may serve their intended function—that of diffracting delineating energy out of the system to decrease brightness, to increase path length thereby increasing magnitude of phase shift for given layer thickness, and in the instance of e.g. circular configurations to serve as Fresnel structures. Such structures may continue to serve for diffracting energy, e.g. to concentrate energy on a given spot or area (to function as a "Fresnel zone plate").

Waveguide Dimensions

Dimensions both of the guides (primarily of their cross-sections normal to intended transmission direction) as well as that of spacing—guide-to-guide spacing—are of critical significance. Limiting dimensions, always with a view of practical limits as influenced by tolerable imperfection in device functioning, may often serve as maxima as well as minima. Spacing, for example, may not exceed a maximum limit for desired uniformity of phase front and at the same time may not fall below some minimum value where the desire is phase variation—e.g., phase generation as well as improved resolution of the device-consequential feature edge.

The relationship of the degree of phase change to such parameters as guide cross-section and refractive index in the medium used is based on well-known principles. Generally, dimensions of concern are comparable to a wavelength (comparable to λ)—more precisely, with a view to the inventive concern for wavelength-limiting delineation—comparable to $\lambda_{cutoff}$ (in terms of the more simple inventive embodiment in which guides are defined within metal boundaries). In terms of usually preferred all-transparent structures, a usual concern is for avoidance of multi-mode transmission. This, again, leads to limiting dimensions comparable to a wavelength. Detailed considerations are set forth in a number of texts—see, "Optical Fibers for Transmission" John E. Midwinter, p. 54, pub. John Wiley & Sons (1979). As well-known and as described in this reference, decreasing relevant guide dimension within the contemplated range—perhaps from λ to ½λ—results in pronounced change in phase velocity (in increasing phase velocity with decreasing dimension). Choice of dimension in accordance with this consideration is with a view to a cross-over between flexibility of design on the one hand and avoidance of unwanted fluctuations on the other.

Dimensional considerations, particularly for all transparent structures, are a function of available values of refractive index. In general, index for glassy material may, for otherwise suitable materials, vary from 1.45 to 1.75 for near-UV (on the usual basis relative to vacuum). The available value of Δn, change in index, of 0.3 increases for shorter delineating energy wavelength—perhaps to a value of ≈0.45 for deep-UV.

The period of waveguide arrays must be taken into account. Attainment of continuous—either flat or varying—phase fronts is in accordance with terms of the formula:

$$\text{period} < \frac{\lambda}{2NA} \times \text{demagnification}$$

where:
period is in the same units as λ demagnification is the reduction of the projected image relative to the mask-produced image (opaque or interference-generated) in terms of a linear dimension (at this time the value of reduction is commonly 5× in these terms), and in which other parameters are as above defined.

If the period of the array is significantly in excess of one or two wavelengths, and assuming an all-transparent mask—the phase change introduced by the waveguides will not be the dominant factor. For waveguides to be the dominant factor in determining the phase of the radiation, the maximum period dimension must be comparable to one or two wavelengths. Within the same constraint—for periods less than the formula value, marked departure—further lessening—results in "white spaces". Resulting bright regions may be intended for a variety of purposes—e.g. with a view to gray scale attendant on device patterning.

Deliberate discontinuity, resulting from period greater than that yielded by the above formula, serves device design needs, e.g. provides for regions of phase front/brightness characteristic of the intrinsic properties of the unmodified (transparent) layer. This consideration leads to structures in which provision is made for layer removal in regions of large dimension—dimensions of sufficient size to ignore waveguiding. Further variation relies on thickness reduction again of such lateral dimensions as to ignore waveguiding. Expeditious fabrication of e.g. masks of this type, is described and claimed in companion U.S. application Ser. No. 07/673,626 filed Mar. 22, 1991 and such application is incorporated by reference.

Structures providing for removal or thinning of such massive regions (relative to λ may give rise to design flexibility—and, significantly, may serve as a vehicle for mask correction.

Polarization of subsequently used delineating radiation is of little consequence with regard to circular guides which operate independently—which are separated by dimensions of many wavelengths. It is of consequence with regard to effectively asymmetric guides—e.g. closely spaced cylindrical guides or guides of non-circular cross-section. Asymmetric guides may offer fabrication advantages and may adequately accommodate asymmetric resolution-impairing objectives (as to lessen effects of ringing).

Radiation To Be Processed

Considerations treated in this section relate to radiation to be affected by the mask or other article as fabricated in accordance with the invention. As in much of the above discussion it is convenient to treat this aspect in terms of device delineation (e.g. in terms of VLSI mask delineation).

The purpose of first generation phase masks will be to obtain higher resolution and image quality with existing and contemplated printers. These include the printers operating with radiation of a variety of wavelengths, e.g. the mercury G line at 4360 Å, the near UV mercury I line at 3650 Å, the deep UV krypton fluoride excimer laser line at 2480 Å, the mercury 2540 Å line, and perhaps the argon fluoride excimer laser line at 1930 Å. In principle, considerations discussed are applicable to delineating radiation of shorter wavelength than that in the UV spectrum. From the practical standpoint, needed guide dimensions comparable to such shorter wavelength radiation—e.g. to radiation in the x-ray spectrum—offer fabrication problems (guide dimension of ≈50 Å presents difficulties). For certain uses, e.g. for Fresnel lenses and zone plates, such dimensions present less difficulty.

In all the systems using projection lithography (using radiation in the optical and soft x-ray spectra) coherence of the illuminating radiation is important. Illumination has both temporal (longitudinal) coherence and lateral or spatial coherence. Temporal coherence is related to the bandwidth of the radiation and can be expressed in terms of coherence length. For interference to occur the phase difference (measured in length) between waves must be less than the coherence length of the radiation. In the cases of interest with respect to phase masks, such phase differences are seldom more than a few wavelengths. Since the coherence length for all radiation sources mentioned is tens or even hundreds of wavelengths, coherence length is not a problem.

The other aspect is spatial or lateral coherence. This is characterized by the numerical aperture, NA, and the filling factor, σ. Use of a laser source, or of a distant point source, results in considerable lateral coherence. Use of a larger source or of a point source that has been diffused results in lessened lateral coherence and, consequently, in larger σ. In ordinary lithography a low σ produces sharper edges on small features but has ringing and interference effects so a σ = ≈0.5 represents a reasonable compromise. In a phase mask ringing is even more severe. Again a large value of $\sigma$ averages out some of the ringing but also degrades the performance of the phase cancellation that produces the desirable effects. Currently phase mask systems are designed to work with existing cameras, i.e. with $\sigma$=about 0.5. The masks described here also work with this $\sigma$, but there is advantage in making $\sigma$ smaller. Normally, partially coherent light (finite $\sigma$) averages out many effects of interference, but complete control of phase and amplitude obviates need for such averaging.

Figure 5:
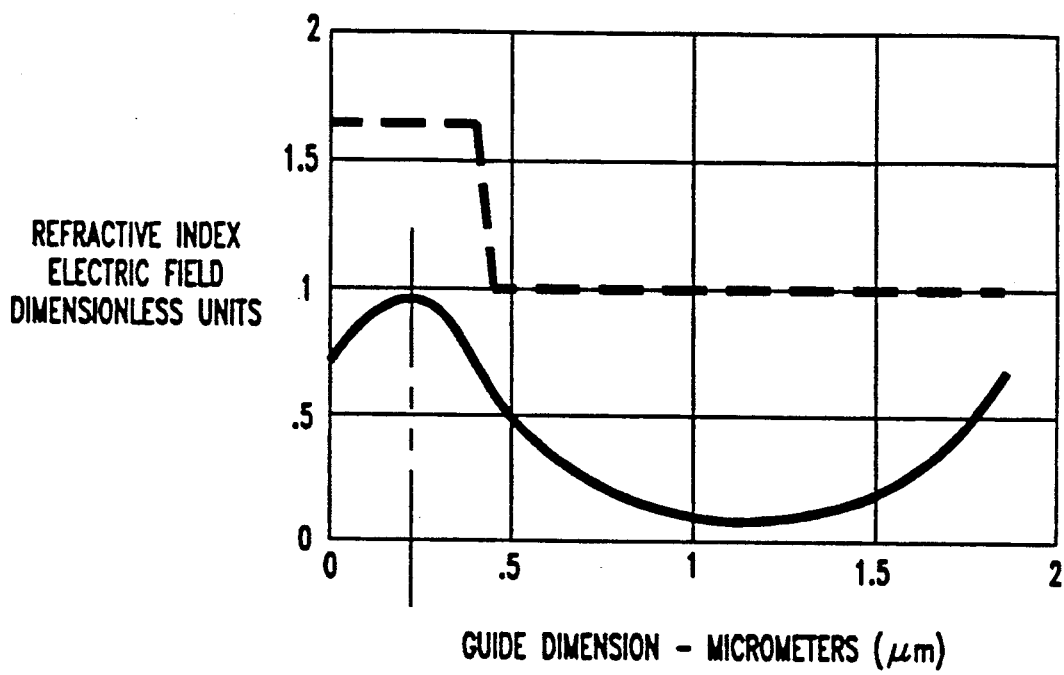
FIGS. 5 and 6 on coordinates of refractive index on the ordinate and lateral core/clad dimension on the abscissa are referred to in conjunction with discussion relating to waveguide design as related to attainment of desired optical properties. Related electric field curves for guided radiation in the same abscissa units and in dimensionless ordinate units are included as well.
Figure 6:
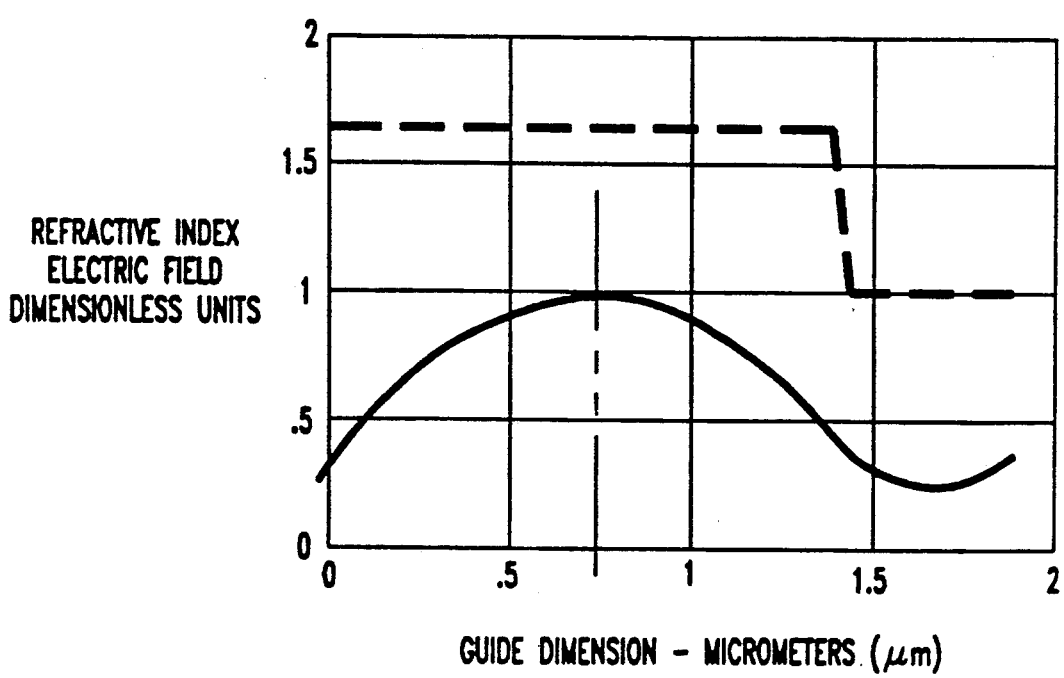

Thus a phase mask is designed to give best results for a particular illumination (regarding $\sigma$ and NA). With an existing camera it is normally difficult to change $\sigma$ without losing light. Optimization requires redesign of the condenser system. FIGS. 5 and 6 in that order are illustrative of small-large and large-small core-cladding all-transparent structures in accordance with the invention. Both figures, in terms of guide dimension on the abscissa and refractive index (broken line) and arbitrary units of electric field (solid line) on the ordinate, relate those dimensions for suitable structures of the invention. Useful perspective is gained from the observation that a core index of 1.6 for a guide length (i.e. layer thickness) of 0.6 $\mu$m (and assuming air cladding) introduces a phase shift as a consequence of increasing phase velocity. Values are $\approx$30° and 150° in accordance with the standard used elsewhere—relative to such value as measured for the same radiation passing through a bulk layer of the same index (1.6).

I claim:

1. Apparatus comprising an article for serving a function entailing processing of electromagnetic radiation made incident on such article, said processing comprising modulating such radiation with desired image patterning information and with additional "compensating" information, and providing for transfer of modulated radiation to an image plane, said processing comprising phase shifting of such radiation as transmitted through such article, in which modulation with such additional information is within spatially selected regions of such radiation, to result in non-image patterning as well as image patterning radiation, such radiation as incident having a spectral distribution of reducing amplitude about a central wavelength and being of sufficient coherence to enable detection of such phase shifting, said apparatus providing for an image plane for imaging such processed electromagnetic radiation, Characterized in that such article includes a waveguide-containing layer, each such waveguide consisting essentially of a guide region comprising guide material, said waveguide being of such dimensions as to result in a phase shift for guided radiation of a magnitude of at least 5° relative to such radiation as transmitted for the same distance through bulk material of the same optical properties as those of which the guide region is comprised, thereby resulting in an image characterized by such phase shifted radiation whereby quality of such image on the said image plane is improved due to phase shifting.

2. Apparatus of claim 1, in which such article is a mask, and in which the said image plane is in a device being fabricated and in which fabrication of such device entails selective processing in accordance with said image.

3. Apparatus of claim 2 in which the said guide region is defined within a cladding material of substantial reflectivity for such guided radiation.

4. Apparatus of claim 3 in which such cladding material is metallic.

5. Apparatus of claim 4 in which the said waveguide-containing layer is metallic.

6. Apparatus of claim 4 in which waveguides comprise apertures.

7. Apparatus of claim 4 in which apertures are filled with material of increased refractive index for such radiation.

8. Apparatus of claim 2 in which the said waveguide-containing layer is transparent to such radiation.

9. Apparatus of claim 8 in which the refractive index of the said guiding material is at least 0.2 larger than that of surrounding waveguide-containing layer material.

10. Apparatus of claim 8 in which at least a region of the said waveguide-containing layer is surfaced with an opaque layer which is apertured in positions in which guides intersect the surface of the waveguiding layer.

11. Apparatus of claim 10 in which the material of the said opaque layer is metallic.

12. Apparatus of claim 2 in which such central wavelength is of a maximum of 0.5 $\mu$m as measured in vacuum and in which quality improvement of the said image due to such phase shifting comprises amplitude lessening of undesired radiation, such undesired radiation comprising radiation produced by diffraction scattering.

13. Apparatus of claim 12 in which amplitude lessening of such undesired radiation results from phase shifting by non-patterning radiation.

14. Apparatus of claim 13 in which such phase shifting is of the approximate value 180° relative to such diffraction scattered radiation as measured on the image plane.

15. Apparatus of claim 12 in which such modulation comprises blocking of radiation by an opaque image pattern in such article and such diffraction scattering is the consequence of interaction of incident radiation with feature edges of such opaque image.

16. Apparatus of claim 15 in which such diffraction scattering produces first resonant ringing and in which amplitude lessening comprises interaction with non-patterning information in turn comprising second resonant ringing of opposite sign and approximately equal period of said first ringing.

17. Apparatus of claim 12 in which at least a part of modulation with desired image patterning information consists essentially of imposition of dark features produced by phase interference.

18. Apparatus of claim 17 in which said dark features are in substantial part produced by a diffraction grating consisting essentially of a grouping of said waveguides.

19. Apparatus of claim 18 in which said dark features include at least one black feature resulting from near-complete scattering of relevant radiation, said black feature corresponding with desired image patterning information.

20. Apparatus of claim 18 in which said dark features include at least one gray feature resulting from incomplete scattering of relevant radiation.

21. Apparatus of claim 18 in which said grating consists essentially of a linear diffraction grating defined by spaced, parallel positioned waveguides of stripe configuration.

22. Apparatus of claim 18 in which said grating consists essentially of spaced curved elongated guides.

23. Apparatus of claim 22 in which said curved guides are circular and concentrically positioned.

24. Apparatus of claim 23 in which such curved guides are of character permitting operation as a Fresnel lens.

25. Apparatus of claim 12 in which said layer contains an array of such waveguides.

26. Apparatus of claim 25 in which such array consists essentially of waveguides of circular cross-section.

27. Apparatus of claim 26 in which such array is two-dimensional.

28. Apparatus of claim 27 in which such two-dimensional array includes waveguides of differing phase delay for said radiation.

29. Apparatus of claim 28 in which alternating waveguides of such two-dimensional array are of equal phase delay for said radiation.

30. Apparatus of claim 2 in which such desired image patterning information is VLSI patterning information.

31. Apparatus of claim 30 in which such central wavelength is of a maximum of 0.5 $\mu$m as measured in a vacuum.

32. Apparatus of claim 31 in which the said image patterning information is of least dimension smaller than 0.5 $\mu$m as measured on the image plane.

33. Apparatus of claim 1 in which said article consists essentially of a diffractive optical element.

34. Apparatus of claim 33 in which such element is a Fresnel element.

* * * * *